US011542035B2

(12) United States Patent
Takahashi et al.

(10) Patent No.: US 11,542,035 B2
(45) Date of Patent: Jan. 3, 2023

(54) SPECTRAL CAMERA CONTROL DEVICE, SPECTRAL CAMERA CONTROL SYSTEM, STORAGE MEDIUM STORING SPECTRAL CAMERA CONTROL PROGRAM, AND NETWORK SYSTEM FOR DISTRIBUTING SPECTRAL CAMERA CONTROL PROGRAM

(71) Applicant: NATIONAL UNIVERSITY CORPORATION HOKKAIDO UNIVERSITY, Sapporo (JP)

(72) Inventors: Yukihiro Takahashi, Sapporo (JP); Junichi Kurihara, Sapporo (JP); Tetsuro Ishida, Sapporo (JP)

(73) Assignee: NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 137 days.

(21) Appl. No.: 16/953,752

(22) Filed: Nov. 20, 2020

(65) Prior Publication Data

US 2021/0114748 A1 Apr. 22, 2021

Related U.S. Application Data

(62) Division of application No. 16/093,624, filed as application No. PCT/JP2017/011411 on Mar. 22, 2017, now Pat. No. 10,864,998.

(30) Foreign Application Priority Data

Apr. 14, 2016 (JP) ................. 2016-080896

(51) Int. Cl.
*H04N 7/00* (2011.01)
*H04N 7/18* (2006.01)
(Continued)

(52) U.S. Cl.
CPC .............. *B64D 47/08* (2013.01); *B64C 27/04* (2013.01); *B64C 39/02* (2013.01); *G01J 3/027* (2013.01);
(Continued)

(58) Field of Classification Search
USPC ........................................................ 348/114
See application file for complete search history.

(56) References Cited

U.S. PATENT DOCUMENTS 7,489,396 B1 2/2009 Vrhel
8,481,259 B2 7/2013 Gordon
(Continued)

FOREIGN PATENT DOCUMENTS

| JP | 2006-30014 A | 2/2006 |
|---|---|---|
| JP | 2011-169896 A | 9/2011 |
| WO | 2013/047627 A1 | 4/2013 |

OTHER PUBLICATIONS

Poling C: "Higher Camera Resolution—When it Helps and When it Hurts", White Paper (Nov. 30, 2014), XP055629595, URL:http://www.uavcropdustersprayers.com/SentekCameraResolution101.pdf.
(Continued)

*Primary Examiner* — Nigar Chowdhury
(74) *Attorney, Agent, or Firm* — Muncy, Geissler, Olds & Lowe, P.C.

(57) ABSTRACT

A spectral camera control device, being installed, along with a spectral camera provided with a liquid crystal tunable filter, in an aircraft capable of stationary flight. The spectral camera control device causes the spectral camera to capture a spectral image in a snapshot mode each time a transmission wavelength of the liquid crystal tunable filter is switched while the aircraft is in stationary flight, and the spectral camera control device causes a plurality of spectral (Continued)

images to be captured in succession at a same transmission wavelength when an SN ratio of the captured spectral image is less than a predetermined threshold.

9 Claims, 11 Drawing Sheets

(51) Int. Cl.
*B64D 47/08* (2006.01)
*B64C 27/04* (2006.01)
*B64C 39/02* (2006.01)
*G01J 3/51* (2006.01)
*G02F 1/13* (2006.01)
*G01J 3/02* (2006.01)
*G01N 21/31* (2006.01)
*G01J 3/28* (2006.01)
*G01J 3/32* (2006.01)
*G01J 3/12* (2006.01)
*G02F 1/1335* (2006.01)
*G01N 21/17* (2006.01)

(52) U.S. Cl.
CPC ............ *G01J 3/0278* (2013.01); *G01J 3/0289* (2013.01); *G01J 3/12* (2013.01); *G01J 3/2823* (2013.01); *G01J 3/32* (2013.01); *G01J 3/51* (2013.01); *G01N 21/31* (2013.01); *G02F 1/13* (2013.01); *G02F 1/133509* (2013.01); *G01J 2003/1213* (2013.01); *G01J 2003/1269* (2013.01); *G01J 2003/283* (2013.01); *G01J 2003/284* (2013.01); *G01J 2003/2826* (2013.01); *G01N 2021/1797* (2013.01); *G01N 2201/0214* (2013.01)

(56) References Cited

U.S. PATENT DOCUMENTS

| | | | |
|---|---|---|---|
| 8,644,911 | B1 | 2/2014 | Panasyuk |
| 9,217,643 | B1 | 12/2015 | Belenkii |
| 9,407,826 | B1 | 8/2016 | Tiana |
| 10,091,405 | B2 | 10/2018 | Molina |
| 2003/0038944 | A1 | 2/2003 | Hamalainen |
| 2003/0198364 | A1 | 10/2003 | Yonover |
| 2007/0077071 | A1 | 4/2007 | Belenkiy |
| 2007/0125951 | A1 | 6/2007 | Snider |
| 2011/0077855 | A1* | 3/2011 | Sumizawa ........ G08G 1/096888 701/533 |
| 2011/0200225 | A1 | 8/2011 | Kukshya et al. |
| 2012/0191339 | A1* | 7/2012 | Lee .................... G01C 21/3647 701/410 |
| 2013/0157698 | A1* | 6/2013 | Kaido .................... H04W 4/18 455/457 |
| 2013/0242131 | A1 | 9/2013 | Timm |
| 2013/0323858 | A1* | 12/2013 | Abdulhalim ......... G01N 21/658 422/69 |
| 2014/0078322 | A1 | 3/2014 | Corcoran |
| 2014/0232858 | A1 | 8/2014 | Ohtomo et al. |
| 2015/0241279 | A1 | 8/2015 | Funamoto |
| 2015/0285685 | A1* | 10/2015 | Wax .................... G01B 9/02091 356/456 |
| 2015/0358588 | A1* | 12/2015 | Grimberg ............. H04N 5/2351 348/143 |
| 2015/0369664 | A1 | 12/2015 | Garsha |
| 2017/0219693 | A1 | 8/2017 | Choiniere |

OTHER PUBLICATIONS

Zhang Yuedong et al.: "An integrated compact airborne multispectral imaging system using embedded computer", Proc. SPIE 9669, Remote Sensing of The Environment: 19th National Symposium on Remote Sensing of China, Aug. 6, 2015, XP060056841, DOI: 10.1117/12.2204805, ISBN: 978-1-62841-730-2.

The partial supplementary European search report for the corresponding EP application No. 17782196.4 dated Nov. 11, 2019.

* cited by examiner

IDEAL SYNTHESIZED VISUAL FIELD

VISUAL FIELD OBTAINED BY ONE EXPOSURE

SPECTRAL CAMERA CONTROL DEVICE, SPECTRAL CAMERA CONTROL SYSTEM, STORAGE MEDIUM STORING SPECTRAL CAMERA CONTROL PROGRAM, AND NETWORK SYSTEM FOR DISTRIBUTING SPECTRAL CAMERA CONTROL PROGRAM

CROSS REFERENCE TO RELATED APPLICATIONS

This application is a divisional application of U.S. application Ser. No. 16/093,624 filed on Oct. 13, 2018, which is a national stage of International Application No. PCT/JP2017/011411 filed Mar. 22, 2017, which is based on and claims priority to Japanese Patent Application No. 2016-080896 filed on Apr. 14, 2016, the disclosures of which are incorporated herein by reference.

TECHNICAL FIELD

The present invention relates to a spectral camera control device, a spectral camera control program, a spectral camera control system, an aircraft equipped with the system, and a spectral image capturing method for capturing spectral images by a spectral camera installed in an aircraft capable of stationary flight.

BACKGROUND ART

A spectral image is obtained by capturing an image of visible light and infrared regions, etc. by a spectral camera. Since this spectral image allows a user to grasp, for example, the protein content of an object captured in an image, it makes it possible to grasp the state of harvest, or grasp harvesting location and harvesting order for better yielding.

Moreover, a spectral image allows a user to grasp the growth of agricultural products and the state of disease, pest insects, and soil, and can also provide accurate information in classification of trees, grasping the carbon fixation rate (growth rate) thereof, searching for mineral resources, estimating a fishery, and grasping regions of seawater damaged and contaminated regions.

In particular, since capturing a spectral image from the sky by an airplane will make it possible to investigate in a short period of time an overwhelmingly vast range including forests, oceans, rugged mountains, and contaminated regions, where access by a human through field survey is difficult, its application range is extremely wide.

Conventionally, when capturing a spectral image having several tens of bands or more, which has a narrow wavelength resolution of about 20 nm or less, an optical device called a hyperspectral sensor including a diffraction grating is installed in an airplane having a fixed wing, and image capturing is performed by using an image capturing method called a push-broom system. This push-broom system is a method for acquiring a spectral image in a two-dimensional space, in which a one-dimensional spatial visual field set in a direction perpendicular to the travelling direction of the airplane is used to simultaneously record all the bands (all the wavelength bands) at one exposure, and this recording is performed successively at a time interval required for moving a distance corresponding to one pixel, thus sweeping in the travelling direction.

For example, Japanese Patent Laid-Open No. 2011-169896 discloses an invention relating to a hyperspectral imaging system equipped with a push-broom type sensor (Patent Literature 1).

CITATION LIST

Patent Literature

[Patent Literature 1] Japanese Patent Laid-Open No. 2011-169896

SUMMARY OF INVENTION

Technical Problem

However, when a spectral image is captured by a push-broom system utilizing an airplane, including the invention according to Patent Literature 1, if the airplane undergoes a disturbance during image capturing, a field of view obtained at a predetermined exposure is spatially deviated with respect to a field of view obtained at a neighboring exposure as shown in FIG. 16, thus causing a problem that spatial distortion and deviation occurs in a synthesized two-dimensional spectral image.

Moreover, a problem exists in that the highest value of spatial resolution in the push-broom system cannot be arbitrarily selected, and a permissible range of exposure time is narrow. That is, letting ground speed of an airplane be V, and exposure time be T, the spatial resolution X in the travelling direction will be $X=V\times T$. Here, in an airplane having a fixed wing, a minimum velocity for safe flight is prescribed based on the capacity of airframe. Moreover, the exposure time T is a value naturally determined for ensuring a sufficient SN (signal to noise) ratio based on the brightness of an image capturing target. Therefore, the highest value of spatial resolution will be a constant value determined from a prescribed minimum speed of the airplane and an exposure time which is automatically determined by the capacity of the spectral camera, and therefore cannot be arbitrarily selected. Moreover, a problem also exists in that when the brightness in the airplane varies due to change of the weather conditions, etc. during image capturing, the exposure time needs to be increased in advance, it is not possible to select an optimal exposure time.

The present invention has been made to solve the above described problems, and has its objective to provide a spectral camera control device, a spectral camera control program, a spectral camera control system, an aircraft equipped with the system, and a spectral image capturing method, with which it is possible to arbitrarily set a spatial resolution and an exposure time when a spectral image is captured, respectively, and suppress spatial distortion and deviation of spectral image.

Solution to Problem

The spectral camera control device and the spectral camera control program according to the present invention are installed, along with a spectral camera provided with a liquid crystal tunable filter, in an aircraft capable of stationary flight, and causes the spectral camera to capture an image in a snapshot mode each time the transmission wavelength of the liquid crystal tunable filter is switched while the aircraft is in stationary flight.

Moreover, as one aspect of the present invention, when either one of the amount of attitude change and the amount of position change of the spectral camera per exposure time in the spectral camera exceeds a predetermined threshold based on the spatial resolution of the spectral camera, the exposure time of the spectral camera may be set to a shorter time than the current exposure time.

Further, as one aspect of the present invention, an angular velocity of the spectral camera may be acquired from an attitude sensor to calculate the exposure time by Formula (1) shown below:

$$T < X/(H \times \Omega) \quad \text{Formula (1)}$$

where each symbol represents the following:
T: Exposure time (sec),
X: Spatial resolution (m),
H: Height of aircraft (m), and
Ω: Angular velocity of spectral camera (rad/sec).

Moreover, as one aspect of the present invention, when the SN ratio of a captured spectral image is less than a predetermined threshold, a plurality of spectral images may be captured in succession at the same transmission wavelength.

Further, as one aspect of the present invention, the number of spectral images to be captured in succession at the same transmission wavelength may be calculated by Formula (2) shown below:

$$N > (SNt/SN1)^2 \quad \text{Formula (2)}$$

where each symbol represents the following:
N: Number of spectral images to be captured,
SN1: SN ratio of first spectral image, and
SNt: SN ratio threshold.

Moreover, a spectral camera control system according to the present invention includes the spectral camera control device and a spectral camera to be controlled by this spectral camera control device.

Further, an aircraft capable of stationary flight according to the present invention has the spectral camera control system installed therein.

Moreover, a spectral image capturing method according to the present invention utilizes the spectral camera control device which is installed along with a spectral camera provided with a liquid crystal tunable filter in an aircraft capable of stationary flight, wherein the spectral camera control device causes the spectral camera to capture an image in a snapshot mode each time the transmission wavelength of the liquid crystal tunable filter is switched while the aircraft is in stationary flight.

Advantageous Effects of Invention

According to the present invention, it is possible to arbitrarily set a spatial resolution and an exposure time when capturing a spectral image, respectively, and suppress spatial distortion and deviation of the spectral image.

DESCRIPTION OF EMBODIMENTS

Hereinafter, one embodiment of the spectral camera control device, spectral camera control program, spectral camera control system, aircraft equipped with the system, and spectral image capturing method according to the present invention will be described by using the drawings.

Figure 1:
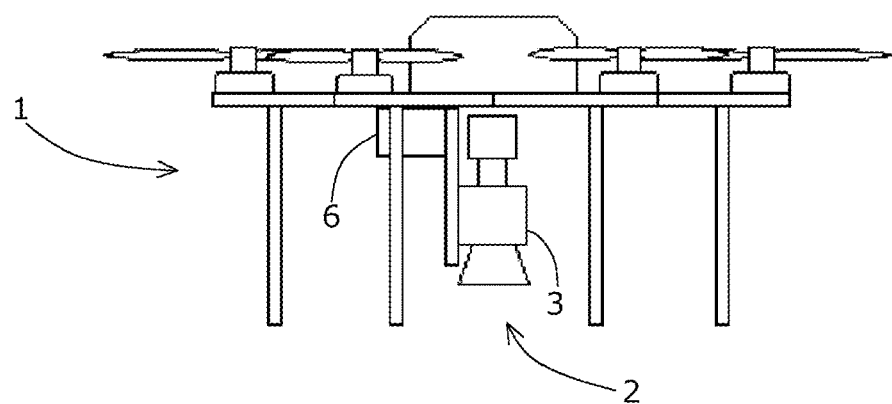
FIG. 1 shows a front view to illustrate an embodiment of an aircraft in which a spectral camera control system according to the present invention is installed.

An aircraft 1 of the present embodiment, which is configured to be capable of stationary flight, is equipped with a spectral camera control system 2 having a spectral camera control device 6 and a spectral camera 3 controlled by the spectral camera control device 6 as shown in FIG. 1. Hereinafter, each configuration will be described in detail.

Figure 2:
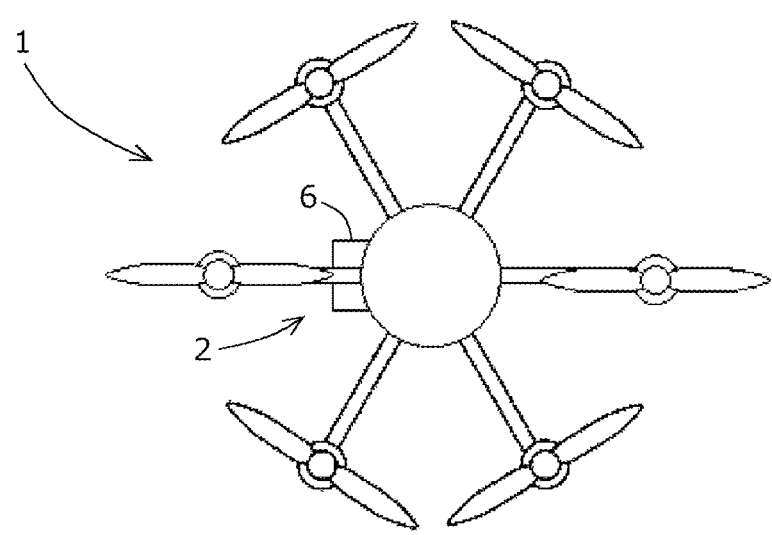
FIG. 2 shows a plan view to illustrate the aircraft of the present embodiment in FIG. 1.

The aircraft 1, which is an aircraft having a function of flying stationary in the air, a so-called hovering function, is made up a multicopter type drone (unmanned aerial vehicle) having a plurality of rotary wings as shown in FIGS. 1 and 2 in the present embodiment. Moreover, the aircraft 1 of the present embodiment has a function of autonomously flying a prescribed flight path and a function of flying by remote control from a communication device and the like. Further, the aircraft 1 has, though not shown, a GPS (Global Positioning System) receiver for detecting the position (longitude, latitude) and the height of the own vehicle in flight, and an attitude sensor for detecting the attitude of the own vehicle in flight.

Note that in the present embodiment, although a multicopter type drone is used in the aircraft 1, it may be, without being limited thereto, any aircraft provided that it is capable of stationary flight, and may be appropriately selected from, for example, helicopters, airships, balloons, and the like.

Figure 3:
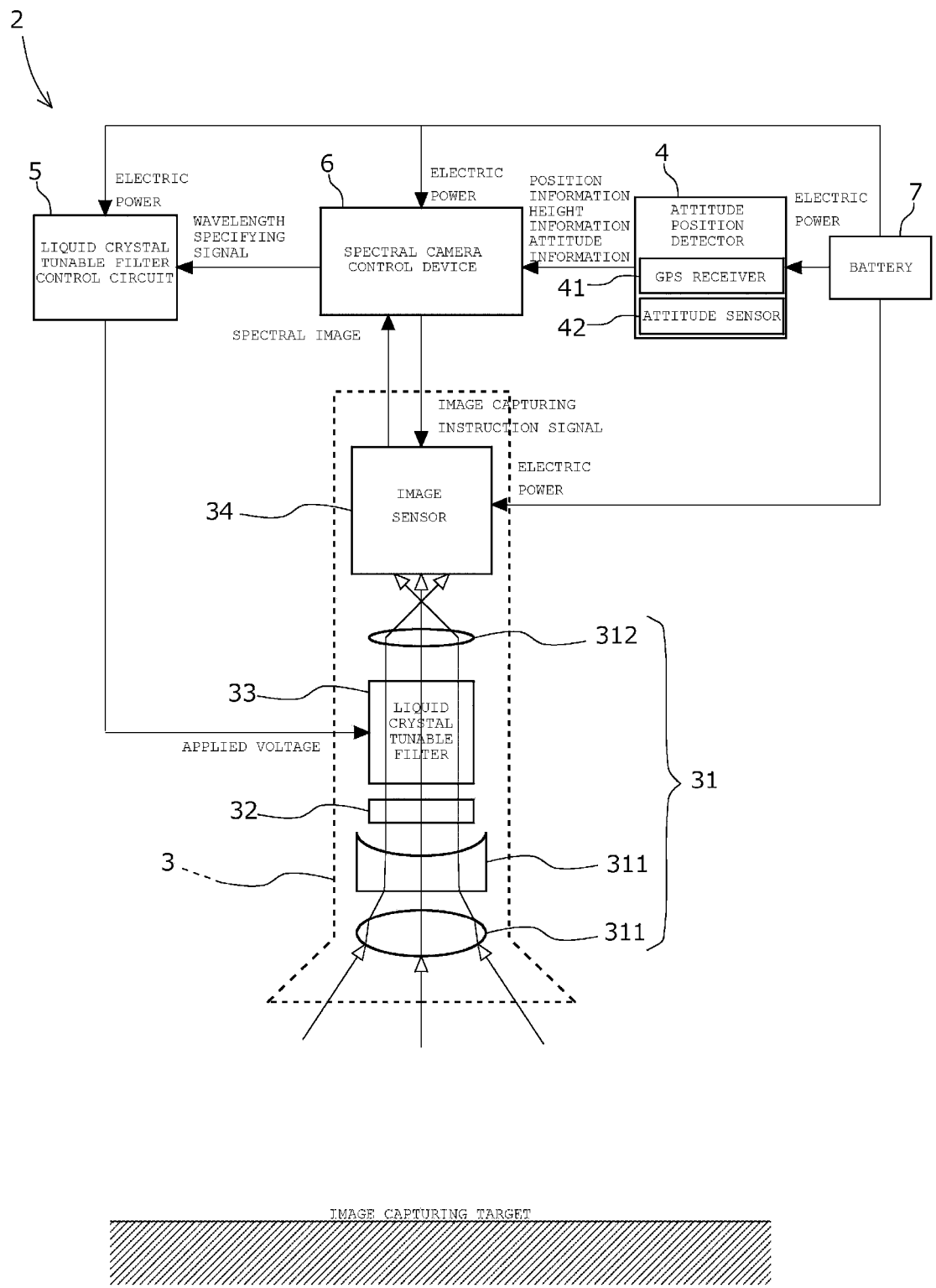
FIG. 3 shows a block diagram to illustrate a spectral camera control system of the present embodiment.

Next, as shown in FIG. 3, the spectral camera control system 2 primarily includes: a spectral camera 3 equipped with a liquid crystal tunable filter 33 (LCTF); an attitude position detector 4 for detecting the attitude and position of the spectral camera 3; a liquid crystal tunable filter control circuit 5 for controlling the liquid crystal tunable filter 33 of the spectral camera 3; a spectral camera control device 6 for controlling the spectral camera 3; and a battery 7 for supplying power to each equipment.

The spectral camera 3, which is for capturing a spectral image in a snapshot mode, primarily includes as shown in FIG. 3: a lens group 31, a depolarizing plate 32 for shifting polarized light into nonpolarized light; the liquid crystal tunable filter 33 with which the transmission wavelength can be arbitrarily selected; and an image sensor 34 for capturing a two-dimensional spectral image.

Then, the spectral camera 3 is installed in the aircraft 1 facing vertically downward as shown in FIGS. 1 and 3 such that the ground surface becomes the image capturing target while the aircraft 1 is in stationary flight. In the present invention, the term "snapshot mode" is supposed to mean a mode in which all the spectral intensities for each position coordinate in a two-dimensional field of view are simultaneously acquired as an image for single predetermined wavelength by one exposure to the image sensor 34.

A lens group 31 causes light from the image capturing target to be transmitted by the liquid crystal tunable filter 33 and causes the light after transmission to be condensed to the image sensor 34 by utilizing refraction of light. The lens group 31 in the present embodiment is constituted of, as shown in FIG. 3, an incident lens 311 for causing the light of image capturing target to be condensed and to enter the liquid crystal tunable filter 33, and a condensing lens 312 for causing only the light having a transmission wavelength after transmission through the liquid crystal tunable filter 33. Note that the kind and number of each lens are not specifically limited, and may be appropriately selected depending on the performance or the like of the spectral camera 3 to condense to the image sensor 34.

The depolarizing plate 32 is for depolarizing polarized light, and transforming it into nonpolarized light. In the present embodiment, the depolarizing plate 32 is provided on the incident side of the liquid crystal tunable filter 33 to depolarize the polarized light before passing through the liquid crystal tunable filter 33, thereby reducing polarization property.

The liquid crystal tunable filter 33 is an optical filter with which it is possible to arbitrarily select a transmission wavelength from a predetermined wavelength range. The liquid crystal tunable filter 33 has a configuration, though not shown, in which a plurality of planar liquid crystal elements and planar polarizing elements are superposed in an alternating manner. For each liquid crystal element, its orientation state is independently controlled by applied voltage supplied from the liquid crystal tunable filter control circuit 5. Therefore, the liquid crystal tunable filter 33 is configured to be able to transmit light of an arbitrary wavelength by a combination of the orientation state of the liquid crystal element and the polarizing element.

Note that in the present embodiment, a range of transmission wavelength of the liquid crystal tunable filter 33 is not more than about 20 nm, transmission center wavelength can be set at an interval of 1 nm, and a wavelength switching time is about 10 ms to several 100 ms.

The image sensor 34 captures a spectral image in a snapshot mode. In the present embodiment, the image sensor 34 is made up of a two-dimensional image sensor such as a CMOS image sensor and a CCD image sensor, which can capture image in a field of view at the same timing.

Moreover, as shown in FIG. 3, the image sensor 34 is configured to perform image capturing based on an image capturing instruction signal transmitted from the spectral camera control device 6.

The attitude position detector 4 is an instrument for detecting the states of attitude and position of the spectral camera 3. The attitude position detector 4 in the present embodiment has a GPS receiver 41 for detecting position information and height information of the spectral camera 3, and an attitude sensor 42 for detecting attitude information of the spectral camera 3.

The GPS receiver 41 is configured to acquire current position information and height information by supplementing positions of a plurality of artificial satellites. The GPS receiver 41 in the present embodiment is configured to acquire longitude information and latitude information as position information, and acquire information of true height as height information. Note that the position information and the height information are not limited to those acquired from the GPS receiver 41, and may be acquired by another method. For example, distance from a reference point may be acquired as the height information by a distance measurement instrument or the like which determines a reference point and utilizes reflection of laser light and sound.

The attitude sensor 42 detects attitude information which includes inclination angle, angular velocity, and acceleration of the spectral camera 3. The attitude sensor 42 in the present embodiment is constituted of, though not shown, a gyroscopic sensor which utilizes gyroscopic property, and an acceleration sensor, and acquires inclination angle, angular velocity, and acceleration in 3-axis directions as the attitude information.

Note that although in the present embodiment position information and attitude information are acquired from the attitude position detector 4 which is provided as the spectral camera control system 2, this configuration is not limiting. For example, position information and attitude information may be acquired from the GPS receiver and the attitude sensor which are already provided in the aircraft 1.

The liquid crystal tunable filter control circuit 5 controls the liquid crystal tunable filter 33. In the present embodiment, as shown in FIG. 3, the liquid crystal tunable filter control circuit 5 supplies applied voltage in accordance with a wavelength specifying signal to the liquid crystal element of the liquid crystal tunable filter 33 upon receiving a wavelength specifying signal transmitted from the spectral camera control device 6. Moreover, the wavelength specifying signal contains information of transmission wavelength which is transmitted by the liquid crystal tunable filter 33, and in the liquid crystal tunable filter control circuit 5, determination is made to which liquid crystal element applied voltage is to be supplied based on the information of the transmission wavelength, and applied voltage is supplied to the discriminated liquid crystal element.

Note that although the liquid crystal tunable filter control circuit 5 in the present embodiment is configured to be independent of other components such as the spectral camera control device 6, this is not limiting and for example it may be provided in the spectral camera control device 6 or the spectral camera 3.

Next, the spectral camera control device 6 of the present embodiment will be described.

Figure 4:
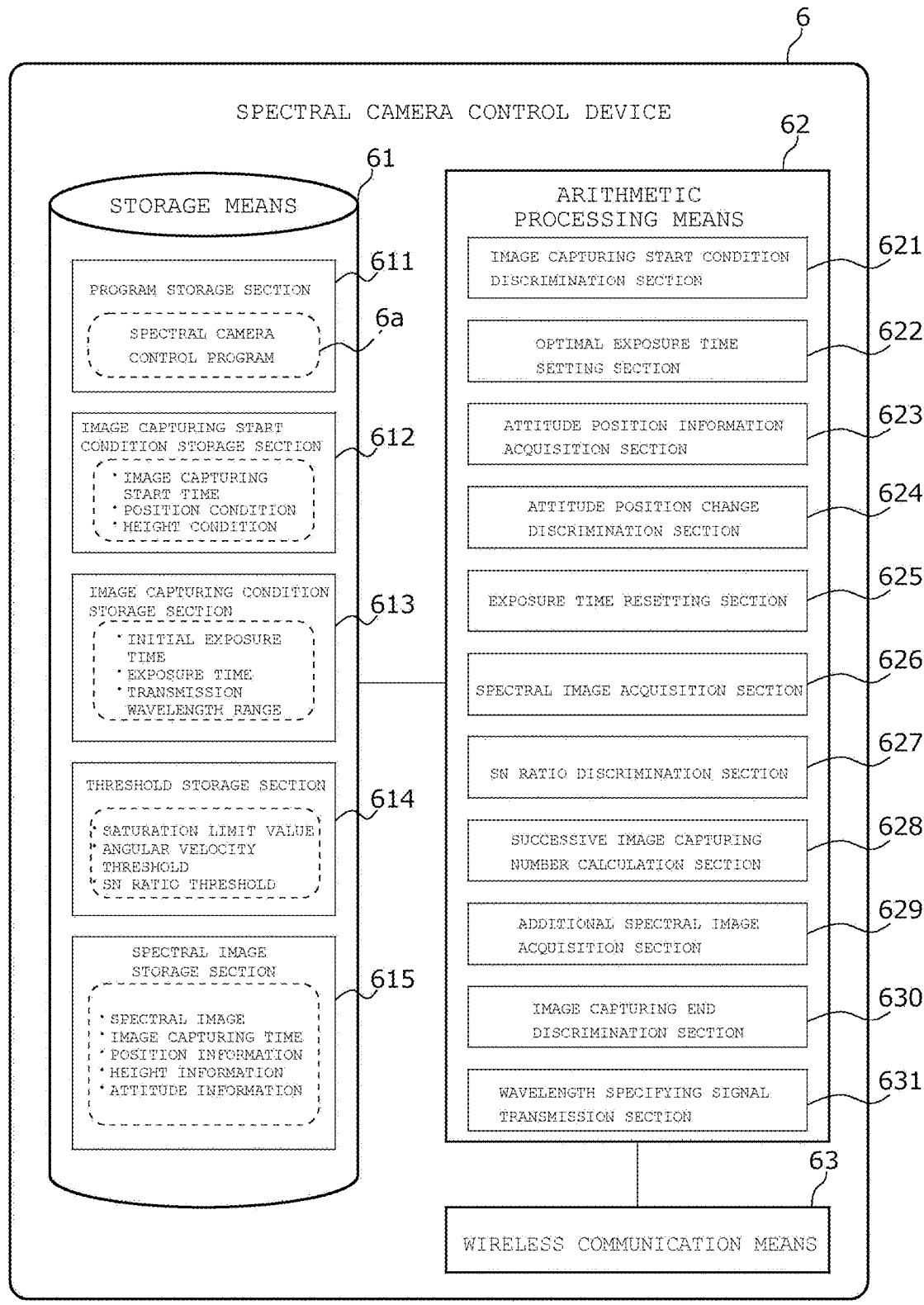
FIG. 4 shows a block diagram to illustrate a spectral camera control device of the present embodiment.

The spectral camera control device 6, which controls capturing of spectral image by the spectral camera 3, primarily consists of, as shown in FIG. 4, storage means 61 for storing spectral camera control program 6a and various data etc., and arithmetic processing means 62 for acquiring various data from this storage means 61, etc. and performing arithmetic processing of the same. Moreover, the spectral camera control device 6 in the present embodiment includes wireless communication means 63 for allowing wireless communication with an external communication device or the like.

The storage means 61, which is made up of ROM, RAM, hard disc, flash memory, etc., stores various data and also functions as a working area when the arithmetic processing means 62 performs arithmetic processing. The storage means 61 in the present embodiment primarily includes: a program storage section 611 for storing the spectral camera control program 6a; an image capturing start condition storage section 612 for storing start condition to capture a spectral image by the spectral camera 3; an image capturing condition storage section 613 for storing image capturing conditions such as exposure time for capturing a spectral image; a threshold storage section 614 for storing various kinds of thresholds; and a spectral image storage section 615 for storing spectral images captured by the spectral camera 3 as well as image capturing time, etc.

The program storage section 611 has the spectral camera control program 6a of the present embodiment installed therein. Thus, the arithmetic processing means 62 executes the spectral camera control program 6a to make a computer function as the spectral camera control device 6 by making it function as each component as described later.

Note that the utilization form of the spectral camera control program 6a is not limited to the above described configuration. For example, the spectral camera control program 6a may be stored in a computer-readable, non-transitory recording medium such as a CD-ROM and a USB memory, and thereafter the program may be read out directly from the recording medium to execute it. Also, the program may be utilized through a cloud computing system or ASP (application service provider) system or the like from an external server, etc.

The image capturing start condition storage section 612 stores information regarding image capturing start condition by the spectral camera 3. In the present embodiment, as the image capturing start condition, as shown in FIG. 4, an image capturing start time which is the time when the spectral camera 3 starts capturing a spectral image; position conditions which are longitude information and latitude information to start capturing the spectral image; and an height condition which is height information to start capturing the spectral image.

Where, the height condition is set depending on a desired spatial resolution of the spectral camera 3. Specifically, a spatial resolution X of a spectral image captured in a snapshot mode is represented as H=H×d/f, supposing that d is a size of one pixel of the image sensor 34, f is a focal length of the spectral camera 3, and H is an height to perform image capturing. Where, d/f is a constant value determined by the specification of the spectral camera 3. Therefore, the spatial resolution X of the spectral camera 3 will be a function of the height H of the spectral camera 3. In another word, the spatial resolution in the present embodiment can be arbitrarily set based on the height condition as the image capturing start condition independently of the exposure time of the spectral camera 3.

The image capturing condition storage section 613 stores various image capturing conditions when capturing spectral images. In the present embodiment, the image capturing condition storage section 613 stores, as shown in FIG. 4, an exposure time which is initially set, an exposure time which is optimized or reset by the processing to be described below, and specific transmission wavelengths which are necessary for capturing images as a spectral image. As the specific transmission wavelengths to be stored in the image capturing condition storage section 613, only necessary specific transmission wavelengths are selected and stored. The specific transmission wavelengths stored here may be transmission wavelengths which specify a predetermined wavelength range either at a regular wavelength interval or at an irregular wavelength interval.

Next, the threshold storage section 614 stores various thresholds for controlling the spectral camera 3. The threshold storage section 614 in the present embodiment stores, as shown in FIG. 4, a saturation limit value which is a limit value of lightness that the image sensor 34 can process; an angular velocity threshold which a limit value of the angular velocity of the spectral camera 3 at which blur occurs in a captured spectral image; and an SN ratio threshold which is a limit value of SN (signal to noise) ratio which is required to acquire various information such as growth of agricultural products from a captured spectral image. Note that detailed information regarding the saturation limit value, the angular velocity at which blur occurs, and the SN ratio will be described below.

The spectral image storage section 615 stores spectral images captured by the spectral camera 3, and the like. The spectral image storage section 615 in the present embodiment stores, as shown in FIG. 4, image capturing times, and position information, height information, and attitude information of the spectral camera 3 at the time of image capturing, along with the spectral images. Note that although the spectral image storage section 615 in the present embodiment is provided in the storage means 61 of the spectral camera control device 6, this is not limiting, and it may be provided on the side of a storage device which is capable of wireless communication with the spectral camera 3 or the spectral camera control device 6.

Next, arithmetic processing means 62 will be described. The arithmetic processing means 62 in the spectral camera control device 6 is made up of a CPU (central processing unit) and the like, and the spectral camera control program 6a installed in the storage means 61 is executed to cause the computer as the spectral camera control device 6 to function as shown in FIG. 4 as an image capturing start condition discrimination section 621, an optimal exposure time setting section 622, an attitude position information acquisition section 623, an attitude position change discrimination section 624, an exposure time resetting section 625, a spectral image acquisition section 626, an SN ratio discrimination section 627, a successive image capturing number calculation section 628, an additional spectral image acquisition section 629, an image capturing end discrimination section 630, and a wavelength specifying signal transmission section 631. Hereinafter, each component will be described in more detail.

The image capturing start condition discrimination section 621 functions to discriminate the image capturing start condition by the spectral camera 3. Specifically, the image capturing start condition discrimination section 621 performs discrimination process on whether or not the current time, the position information and the height information of the spectral camera 3 detected by the attitude position detector 4 satisfy the image capturing start time, the position condition and the height condition stored in the image capturing start condition storage section 612. Then, when the image capturing start condition is satisfied, the image capturing start condition discrimination section 621 starts the image capturing process by the spectral camera 3.

The optimal exposure time setting section 622 functions to automatically set an optimal exposure time of the spectral camera 3. Specifically, the optimal exposure time setting section 622 first causes the image capturing condition storage section 613 to capture one spectral image at an initially set exposure time to acquire a maximum pixel value in the spectral image. Next, the optimal exposure time setting section 622 discriminates whether or not the maximum pixel value is less than the saturation limit value stored in the threshold storage section 614.

Then, if the maximum pixel value is less than the saturation limit value as a result of the discrimination, the optimal exposure time setting section 622 sets the initially set exposure time as the optimal exposure time. On the other hand, if the maximum pixel value is not less than the saturation limit value, the optimal exposure time setting section 622 decreases the exposure time, and again causes a spectral image to be captured, thus repeating the above described process until the maximum pixel value becomes less than the saturation limit value. Then, the exposure time when the maximum pixel value becomes less than the saturation limit value is set as an optimal exposure time in the image capturing condition storage section 613.

Here, the meaning of the above described processing by the optimal exposure time setting section 622 will be described. In the image sensor 34 of the spectral camera 3, light radiated form the image capturing target is detected as an electric signal, and that analog electric signal is digitized to obtain image information. Because of that, when light radiated from the image capturing target is dark, the noise relatively increases. Therefore, it is necessary to increase the exposure time to receive sufficient light. However, when the image sensor 34 receives light brighter than the limit for the processing, the analog electric signal becomes saturated, disabling to acquire a signal of accurate value. Therefore, the optimal exposure time setting section 622 is adapted to set an exposure time at which a brightest image is obtained within a range that the analog electric signal is not saturated, as an optimal exposure time.

Note that generally, the exposure time is determined based on the lightness, that is, spectral radiance (W/m$^2$/sr/nm) of the image capturing target. The spectral radiance $I(\lambda)$ has a relationship with a pixel value D for each pixel of an spectral image to be acquired: $I(\lambda)=C(\lambda) \times D/T$. Where, $C(\lambda)$ is a calibration factor at a wavelength $\lambda$ and is a value obtained by experiment using a known light source. Therefore, the optimal exposure time setting section 622 is adapted to set an exposure time based on the pixel value which is in proportional relationship with the lightness of the image capturing target.

In this way, the spectral camera control device 6 of the present embodiment is configured to be able to set the exposure time of the spectral camera 3 separately, independent of spatial resolution.

Next, the attitude position information acquisition section 623 functions to acquire an amount of attitude change or an amount of position change of the spectral camera 3 per exposure time of the spectral camera 3 from the attitude position detector 4. The attitude position information acquisition section 623 in the present embodiment acquires an angular velocity of the spectral camera 3 from the attitude sensor 42.

The attitude position change discrimination section 624 discriminates whether or not the attitude and the stationary position of the aircraft 1 have changed to a level that causes blur in the spectral image. The attitude position change discrimination section 624 in the present embodiment functions to discriminate whether or not at least either one of the amount of attitude change and the amount of position change of the spectral camera 3 per exposure time of the spectral camera 3 acquired by the attitude position information acquisition section 623 is within a predetermined threshold which is based on the spatial resolution of the spectral camera 3.

Figure 5:
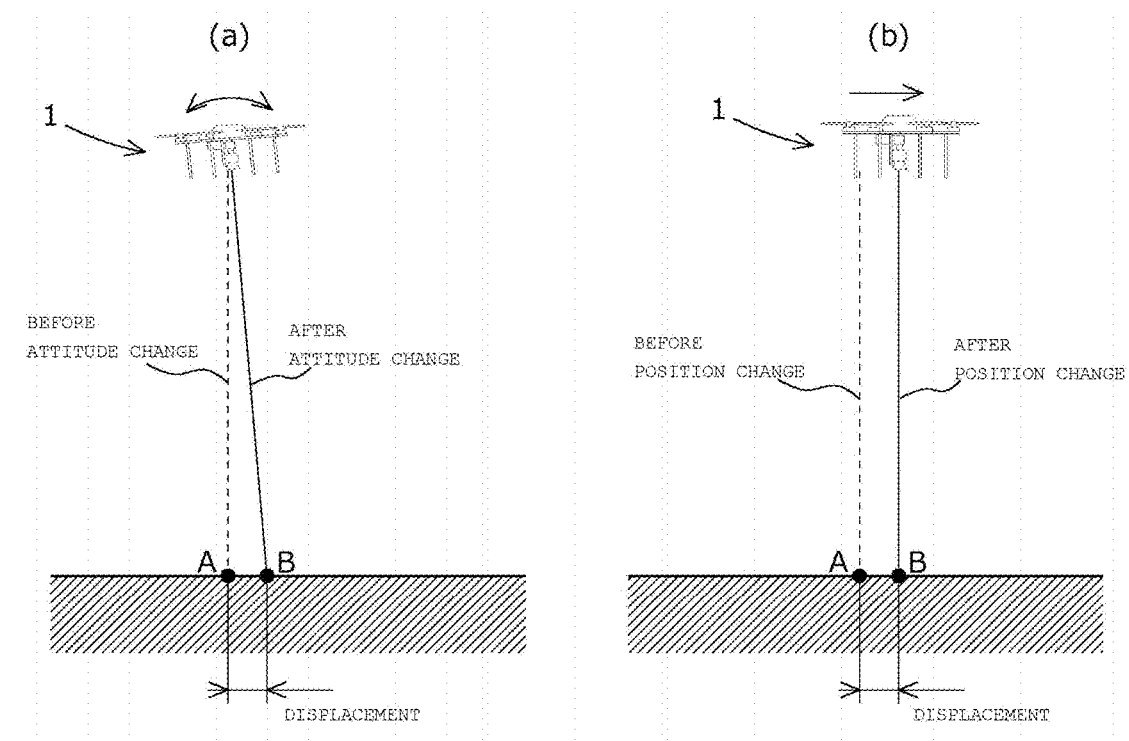
FIG. 5 shows a diagram to explain a factor to cause a blur to occur in a spectral image in the present embodiment.

Here, factors that cause a blur in a spectral image will be described. In the present embodiment, image capturing of a spectral image is performed while the aircraft 1 is in stationary flight. However, if the aircraft 1 is subjected to an external factor such as gush wind etc. during stationary flight, attitude change of the aircraft 1 as shown in FIG. 5(*a*), and position change of stationary flight as shown in FIG. 5(*b*) occur. Then, when due to attitude change or position change of the aircraft 1, displacement of a right-below point of the image capturing target (displacement from point A to point B in FIG. 5) within an exposure time exceeds the spatial resolution of the spectral camera 3, blur will occur in the captured spectral image.

Moreover, since the spectral camera 3 captures images from a high place which is at a long distance to the image capturing target, displacement of a right-below point of the image capturing target within an exposure time increases in proportion to the height. Therefore, supposing that T is exposure time, X is spatial resolution, and H is height of the spectral camera 3 when a spectral image is captured, when angular change per exposure time T becomes larger than X/H, that is, the angular velocity of the aircraft 1 becomes not less than X/(H×T), blur occurs in a spectral image to be captured.

In view of what has been described so far, the attitude position change discrimination section 624 functions to compare the angular velocity of the spectral camera 3 acquired by the attitude position information acquisition section 623 with a predetermined angular threshold stored in the threshold storage section 614, and to discriminate whether or not the angular velocity has exceeded the angular velocity threshold.

Note that although in the attitude position change discrimination section 624 in the present embodiment, discrimination is made on whether or not blur will occur in a spectral image based on the angular velocity of the spectral camera 3, this is not limiting, and as shown in FIG. 5(*b*), since blur due to position change also occurs, discrimination may be made on whether or not blur of spectral image will occur based on the rate of position change acquired from the acceleration sensor of the attitude sensor 42 or the amount of position change acquired from the GPS receiver 41.

Next, the exposure time resetting section 625 functions to reset the exposure time of the spectral camera 3 such that blur will not occur in a spectral image. Specifically, the exposure time resetting section 625 is adapted, when it is discriminated that the angular velocity has exceeded the angular velocity threshold by the attitude position change discrimination section 624, to reset an exposure time, which is shorter than the currently set exposure time, as a new exposure time in the image capturing condition storage section 613.

The exposure time resetting section 625 in the present embodiment acquires an angular velocity of the spectral camera 3 from the attitude sensor 42 which detects the angular velocity as the amount of attitude change of the spectral camera 3, and calculates a new exposure time by Formula (1) shown below, and makes it stored and reset in the image capturing condition storage section 613 as the exposure time of the spectral camera 3:

$$T < X/(H \times \Omega) \quad \text{Formula (1)}$$

where each symbol represents the following:
T: Exposure time (sec),
X: Spatial resolution (m),
H: Height of aircraft (m), and
$\Omega$: Angular velocity of spectral camera (rad/sec).

Note that the height H of the aircraft 1 is acquired from the image capturing start condition storage section 612, and the spatial resolution X is, as described above, calculated based on the height H.

Figure 6:
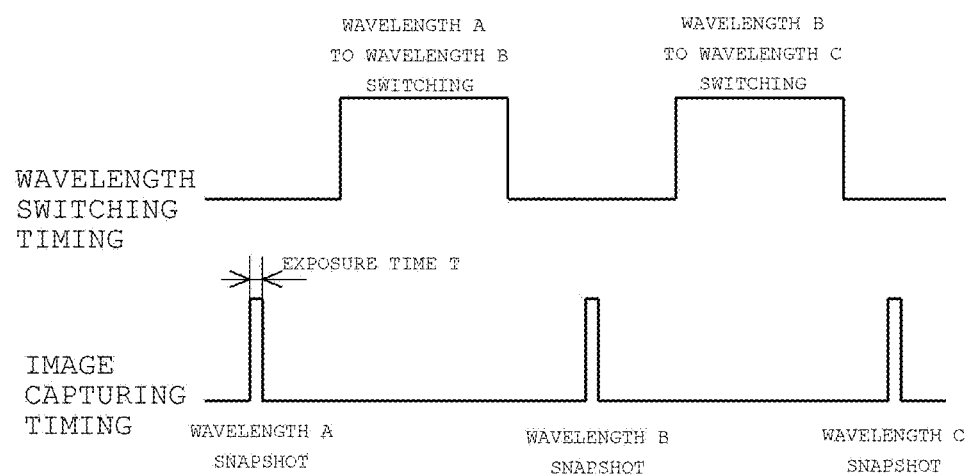
FIG. 6 shows a diagram to illustrate relationship between the timing of switching the transmission wavelength of the liquid crystal tunable filter and the timing of capturing an image with an image sensor in the present embodiment.

The spectral image acquisition section 626 functions to transmit an image capturing instruction signal, which causes the image sensor 34 to capture an image, to the spectral camera 3, and to acquire a spectral image captured in a snapshot mode. In the present embodiment, the spectral image acquisition section 626 is adapted, as shown in FIG. 6, to capture a spectral image once each time the transmission wavelength of the liquid crystal tunable filter 33 is switched by the liquid crystal tunable filter control circuit 5 and store it in the spectral image storage section 615.

The SN ratio discrimination section 627 functions to discriminate whether or not an SN ratio is less than a predetermined SN ratio threshold to confirm whether or not the acquired spectral image ensures image quality necessary for acquiring various information. Then, as a result of discrimination, only when the SN ratio is less than the SN ratio threshold, the spectral image acquisition section 626 is caused to capture a plurality of spectral images in succession at the same transmission wavelength.

Where, the term SN ratio means a numerical value of a signal level (signal) divided by a noise level (noise). However, since the noise level exhibits approximately constant value in the same spectral camera 3, the same liquid crystal tunable filter 33, the same lens configuration, the same setting condition and the same image capturing environment, it can be measured in advance. Therefore, the SN ratio of spectral image can be determined by calculating only the signal level based on a pixel value.

Therefore, in the present embodiment, the SN ratio discrimination section 627 calculates a signal level from a spectral image acquired by image capturing, and calculates an SN ratio by dividing that by the noise level measured in advance. Then, the SN ratio is to be compared with the SN ratio threshold stored in the threshold storage section 614.

A successive image capturing number calculation section 628 calculates the image capturing number of spectral images to be additionally captured to improve the image quality of spectral image. Even for a spectral image with a low SN ratio, it is expected that the SN ratio of the spectral image obtained by superposing a plurality of spectral images of the same transmission wavelength is improved by image processing. For this reason, when it is discriminated that the SN ratio of the acquired spectral image is less than the SN ratio threshold by the discrimination processing of the SN ratio discrimination section 627, the successive image capturing number calculation section 628 functions to calculate the number of images to be superposed in order that the SN ratio of the spectral image is larger than the SN ratio threshold.

To be specific, while the signal level when N images are superposed will be N times, the noise level has a characteristic to become $\sqrt{N}$ times. Therefore, the SN ratio when N images are superposed will be (N/$\sqrt{N}$) times, that is, $\sqrt{N}$ times of the SN ratio of the first spectral image. Thus, the successive image capturing number calculation section 628 calculates an integer value that satisfies Formula (2) shown below as the number N of the spectral images to be acquired in succession:

$$N > (SNt/SN1)^2 \quad \text{Formula (2)}$$

where each symbol represents the following:
N: number of spectral images to be captured,
SN1: SN ratio of the first spectral image, and
SNt: SN ratio threshold.

Note that the number of spectral images to be captured in succession is not limited to the number calculated by the method of Formula (2) shown above, and may be a predetermined number.

An additional spectral image acquisition section 629 is for additionally acquiring spectral images to improve image quality of the spectral image. In the present embodiment, when it is discriminated that the SN ratio of an acquired spectral image is less than the SN ratio threshold by the SN ratio discrimination section 627, the additional spectral image acquisition section 629 transmits an image capturing instruction signal of N−1 images in which the first image is subtracted from the number N calculated by the successive image capturing number calculation section 628 to the spectral camera 3 so that spectral images of the same transmission wavelength are to be acquired in succession.

Figure 7:
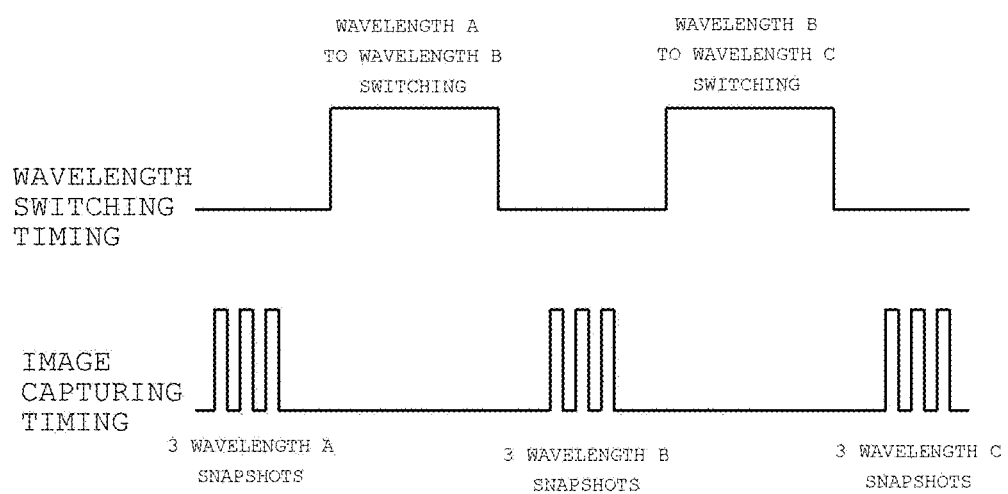
FIG. 7 shows a schematic view to illustrate relationship between the timing of switching the transmission wavelength and the timing of capturing an image when a plurality of spectral images at the same transmission wavelength are acquired in succession

Specifically, as shown in FIG. 7, before the transmission wavelength of the liquid crystal tunable filter 33 is switched by the liquid crystal tunable filter control circuit 5, the additional spectral image acquisition section 629 transmits an image capturing instruction signal of N−1 images to the spectral camera 3 in succession to the image capturing instruction signal by the spectral image acquisition section 626, so that spectral images at the same transmission wavelength are captured in succession in a snapshot mode.

An image capturing end discrimination section 630 functions to discriminate whether or not image capturing of spectral image is finished. In the present embodiment, the image capturing end discrimination section 630 compares the transmission wavelength range stored in the image capturing condition storage section 613 with the captured spectral image, and determines that image capturing is finished when spectral images for all the wavelengths are captured.

The wavelength specifying signal transmission section 631 is for transmitting a wavelength specifying signal to the liquid crystal tunable filter control circuit 5, thereby switching the transmission wavelength of the liquid crystal tunable filter 33. In the present embodiment, the wavelength specifying signal transmission section 631 functions to successively transmit a wavelength specifying signal to the liquid crystal tunable filter control circuit 5 as long as image capturing is not finished. Specifically, the wavelength specifying signal transmission section 631 transmits wavelength specifying signals corresponding to specific transmission wavelengths which have not been captured yet among the specific transmission wavelengths stored in the image capturing condition storage section 613 in a predetermined order to the liquid crystal tunable filter control circuit 5. The transmission of the wavelength specifying signal is repeatedly performed each time a spectral image is acquired by capturing image by each transmission wavelength, and when spectral images by all the specific transmission wavelengths are acquired, the image capturing is finished.

Wireless communication means 63 is for performing wireless communication with a communication device. The wireless communication means 63 is a transmitter-receiver for performing wireless communication through any wireless communication scheme such as a communication network of mobile phone, wireless LAN, Wi-Fi, Bluetooth (registered trademark), or the like. The wireless communication means 63 is capable of remote control and various setting of the spectral camera control device 6, and transmission and reception of data such as spectral images through the wireless communication.

A battery 7 supplies electric power to each instrument, and in the present embodiment, as shown in FIG. 3, is connected to each of the attitude position detector 4, the spectral camera control device 6, the liquid crystal tunable filter control circuit 5, and the image sensor 34 of the spectral camera 3 to supply electric power. Note that although the battery 7 for the image sensor 34 in the present embodiment is used in common for the spectral camera control device 6 and others, this is not limiting, and the spectral camera 3 may be equipped with an original battery.

Next, actions of the spectral camera control device 6, the spectral camera control program 6a, the spectral camera control system 2, the aircraft 1 equipped with the system, and the spectral image capturing method of the present embodiment will be described.

First, the aircraft 1 in the present embodiment performs autonomous flight along a flight path prescribed by the control program of the aircraft 1 thereby flying to an image capturing point of a predetermined position and a predetermined height, and performs stationary flight at the image capturing point. At this moment, since the spatial resolution of the spectral image is in proportional relationship with the height of the aircraft 1, it is possible to control the spatial resolution at any value by means of the height.

Figure 8:
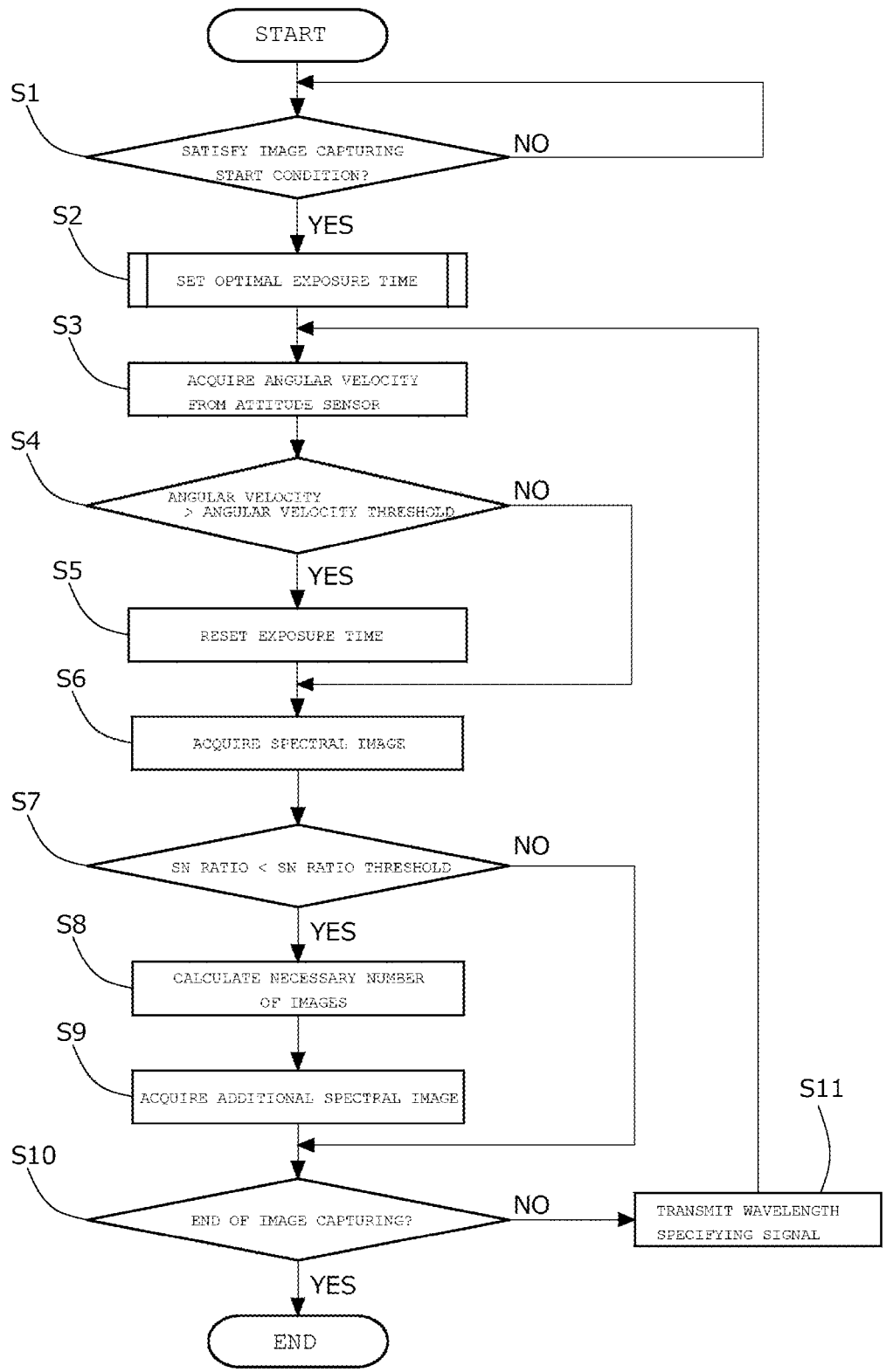
FIG. 8 shows a flowchart to illustrate processing operation of the spectral camera control device of the present embodiment.

Next, in the spectral camera control device 6, discrimination processing on whether or not the spectral camera 3 satisfies the image capturing start condition is performed by the image capturing start condition discrimination section 621 as shown in FIG. 8 (step S1). Specifically, the image capturing start time, the position condition, and the height condition are acquired as the image capturing start condition from the image capturing start condition storage section 612, and the position information and the height information of the spectral camera 3 are acquired from the GPS receiver 41, thereby discriminating whether or not the image capturing start condition is satisfied. This discrimination is repeatedly performed until the state of the spectral camera 3 satisfies all the image capturing start conditions (step S1: NO).

Figure 9:
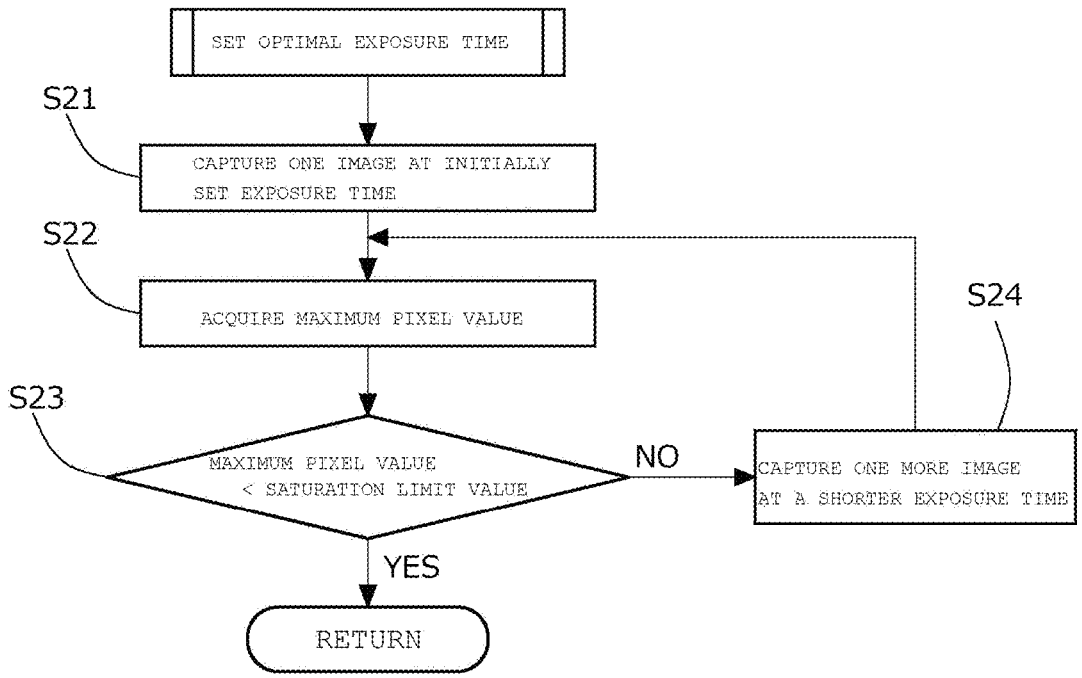
FIG. 9 shows a flowchart to illustrate processing operation of an optimal exposure time setting section in the spectral camera control device of the present embodiment.

Next, when the image capturing start condition discrimination section 621 discriminates that all the image capturing start conditions are satisfied (step S1: YES), the optimal exposure time setting section 622 automatically sets an optimal exposure time of the spectral camera 3 (step S2). Specifically, as shown in FIG. 9, first the optimal exposure time setting section 622 causes the spectral camera 3 to capture one spectral image at an initially set exposure time (step S21), and acquires a maximum pixel value in the spectral image (step S22).

Next, the optimal exposure time setting section 622 discriminates whether or not the maximum pixel value is less than the saturation limit value stored in the threshold storage section 614 (step S23). When as a result of the discrimination, it is discriminated that the maximum pixel value is not less than the saturation limit value (step S23: NO), the optimal exposure time setting section 622 sets the exposure time to a shorter time than the initially set exposure time, and again causes the spectral camera 3 to capture one spectral image (step S24). Then, the processing from step S22 is repeated, and when it is discriminated that the maximum pixel value is less than the saturation limit value (S23: YES), the optimal exposure time setting section 622 sets the exposure time set at that point in time as the optimal exposure time of the spectral camera 3. As a result of this, even when brightness varies due to changes in the sun elevation and cloud cover during stationary flight, image capturing at an optimal exposure time is possible.

Next, when the attitude position information acquisition section 623 acquires an angular velocity from the attitude sensor 42 (step S3), the attitude position change discrimination section 624 compares the angular velocity with the angular velocity threshold stored in the threshold storage section 614 to discriminate whether or not the angular velocity exceeds the angular velocity threshold (step S4). When as a result of the discrimination, it is discriminated that the angular velocity of the spectral camera 3 is not more than the angular velocity threshold (step S4: NO), resetting of the exposure time is not performed assuming that the aircraft 1 is stably in stationary flight, and the exposure time set by the optimal exposure time setting section 622 is set as the exposure time of the spectral camera 3.

On the other hand, when the attitude position change discrimination section 624 discriminates that the angular velocity of the spectral camera 3 exceeds the angular velocity threshold (step S4: YES), the exposure time resetting section 625 resets the exposure time of the spectral camera 3 to a new exposure time which is of a shorter time than the current exposure time (step S5). Since as a result of this, the exposure time is automatically regulated to a level that will not cause blur in the spectral image, deterioration of the spatial resolution will be suppressed.

As described so far, in the spectral camera control device 6 of the present embodiment, it is possible to independently set the exposure time and the spatial resolution. As a result of this, it is possible to regulate the exposure time in real time depending on the amount of attitude change and the amount of position change of the spectral camera 3 while ensuring high spatial resolution, thereby suppressing blur of spectral image.

Next, the spectral image acquisition section 626 transmits an image capturing instruction signal to the spectral camera 3 to acquire a spectral image (step S6). At this moment, the acquired spectral image is stored along with the image capturing time, position information, height information, and attitude information in the spectral image storage section 615. As a result of this, image processing such as geometrical correction to make field of views finally matched becomes easy.

Next, the SN ratio discrimination section 627 discriminates whether or not the SN ratio of the acquired spectral image is less than the SN ratio threshold (step S7). As a result of this, even when an optimal exposure time set by the optimal exposure time setting section 622 is thereafter reset depending on the amount of attitude change and the amount of position change of the spectral camera 3, the appropriateness of the SN ratio can be discriminated.

When as a result of the above described discrimination, it is discriminated that the SN ratio of the acquired spectral image is less than the SN ratio threshold (step S7:YES), the successive image capturing number calculation section 628 calculates the image capturing number of spectral images to be superposed based on Formula (2) shown above (step S8).

Then, the additional spectral image acquisition section 629 transmits an image capturing instruction signal based on the image capturing number calculated by the successive image capturing number calculation section 628, and as shown in FIG. 7, acquires spectral images of the same transmission wavelength in succession (step S9). As a result of this, even under an image capturing condition in which a predetermined SN ratio cannot be ensured with a single spectral image, spectral images are acquired in an enough number to be able to ensure the SN ratio by superposing them.

On the other hand, when the SN ratio discrimination section 627 discriminates that the SN ratio of the acquired spectral image is not less than the SN ratio threshold (step S7:NO), the process proceeds to the next processing without additionally acquiring spectral images (step S10).

When a necessary number of spectral images are acquired, the image capturing end discrimination section 630 discriminates whether or not the capturing of spectral images is finished (step S10). Then, when as a result of the discrimination, it is discriminated that capturing of spectral images is not finished (step 10: NO), the wavelength specifying signal transmission section 631 transmits an uncaptured wavelength specifying signal to the liquid crystal tunable filter control circuit 5 (step S1).

As a result of this, the liquid crystal tunable filter control circuit 5 supplies applied voltage in accordance with the received wavelength specifying signal to the liquid crystal tunable filter 33 of the spectral camera 3. Then, in the liquid crystal tunable filter 33, the orientation state of the liquid crystal element is controlled according to the applied voltage, and switching to specified transmission wavelength by the wavelength specifying signal is performed.

Then, when the wavelength specifying signal is transmitted (step S11), the process goes back to step S3 described above, and this step is repeated each time a spectral image at each transmission wavelength is acquired. As a result of this, it becomes possible to significantly reduce the time relating to image capturing of a series of spectral images by acquiring only spectral images of necessary, minimum transmission wavelengths depending on the purpose, thereby also extending movable range of the aircraft 1. Then, when spectral images by all the transmission wavelength are acquired, image capturing is finished (step S10: YES).

After the image capturing by the spectral camera 3 is finished, the aircraft 1 is changed from a stationary flight state to an autonomous flight, thus flying to a next image capturing point. The spectral camera control device 6 captures a spectral image of the same or a different transmission wavelength as or from those of spectral images captured at image capturing points until then at the next image capturing point. Then, the aircraft 1 returns or lands to a predetermined location after finishing image capturing at all the image capturing points.

According to the present embodiment as described above, the following effects can be obtained.
1. Since the spectral camera 3 equipped with the liquid crystal tunable filter 33 is installed in the aircraft 1 capable of stationary flight and caused to capture an image in a snapshot mode, it is possible to arbitrarily set the spatial resolution of spectral image depending on image capturing height.
2. Since the exposure time of the spectral camera 3 can be set independently of the spatial resolution of the spectral camera 3, and is reset in real time based on the amount of attitude change or the amount of position change of the spectral camera 3, it is possible to suppress spatial distortion and blur of spectral image.
3. Since the control function of spatial resolution and the suppression function of blur caused by the aircraft 1 can be controlled independently, it is possible to capture a spectral image with a high spatial resolution.
4. It is possible to ensure a predetermined SN ratio for all the wavelengths to be captured as a spectral image.
5. It is possible to automatically calculate the image capturing number necessary for ensuring a predetermined SN ratio.
6. Since the image sensor 34 and the liquid crystal tunable filter 33 of a snapshot mode are relatively light weight and inexpensive, and can be installed in a commercially available aircraft 1 capable of stationary flight, it is possible to suppress manufacturing cost thereof and make them widely used.
7. By installing the liquid crystal tunable filter 33 of snapshot mode in the aircraft 1 capable of stationary flight, it is possible to automatically capture a spectral image at a specified time and a specified position.

Next, specific examples of the spectral camera control device 6, the spectral camera control program 6a, the spectral camera control system 2, the aircraft 1 equipped with the system, and the spectral image capturing method according to the present invention will be described. Note that the technical scope of the present invention will not be limited to features shown by the following examples.

Example 1

In Example 1, a spectral camera equipped with a liquid crystal tunable filter was installed in a multicopter type drone to capture spectral images.

Figure 10:
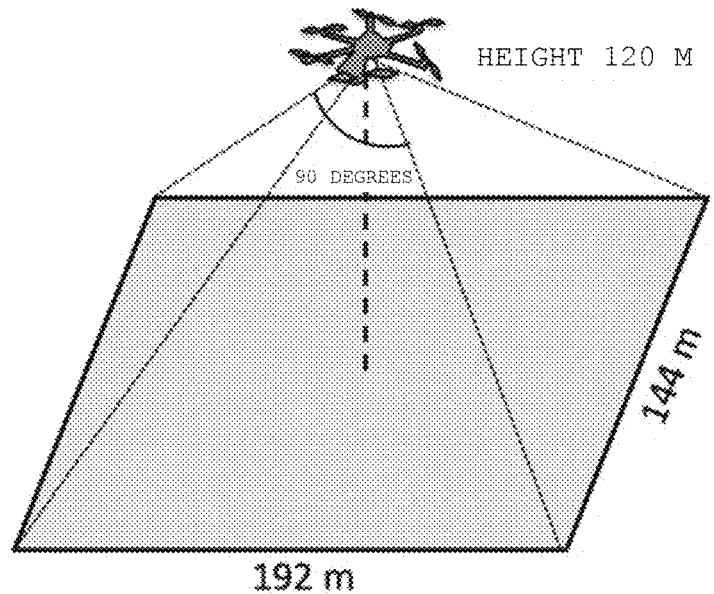
FIG. 10 shows a schematic view to represent a state of capturing spectral images in Example 1.

The spectral camera included, as shown in FIG. 10, a lens of a diagonal viewing angle of about 90 degrees. The image sensor was a CCD image sensor whose number of pixels was 659×494. The aircraft was made to fly stationary at an height of about 120 m. At this moment, the size of the field of view projected on the ground was 192 m×144 m. Moreover, one side of a pixel of the image sensor corresponded to about 0.22 m. That is, the spatial resolution of the spectral camera of Example 1 was about 0.22 m.

Image capturing in Example 1 was performed at an interval of 10 nm from 460 nm to 780 nm for 33 transmission wavelengths. Specifications regarding image capturing are as shown in Table 1 below.

TABLE 1

| | |
|---|---|
| Number of CCD pixels | 659 × 494 pixels |
| Exposure time per one pixel | 10 ms |
| Size of one pixel at right-below point (spatial resolution) | about 0.22 m |
| SN ratio (@ 750 nm) | 70 |
| Transmission wavelength | 33 transmission wavelengths from 460 nm to 780 nm |
| Bandwidth of transmission wavelength | 5.8 nm to 23.2 nm (by center wavelength) |
| MTF (Nyquist) | 12% |

Figure 11:
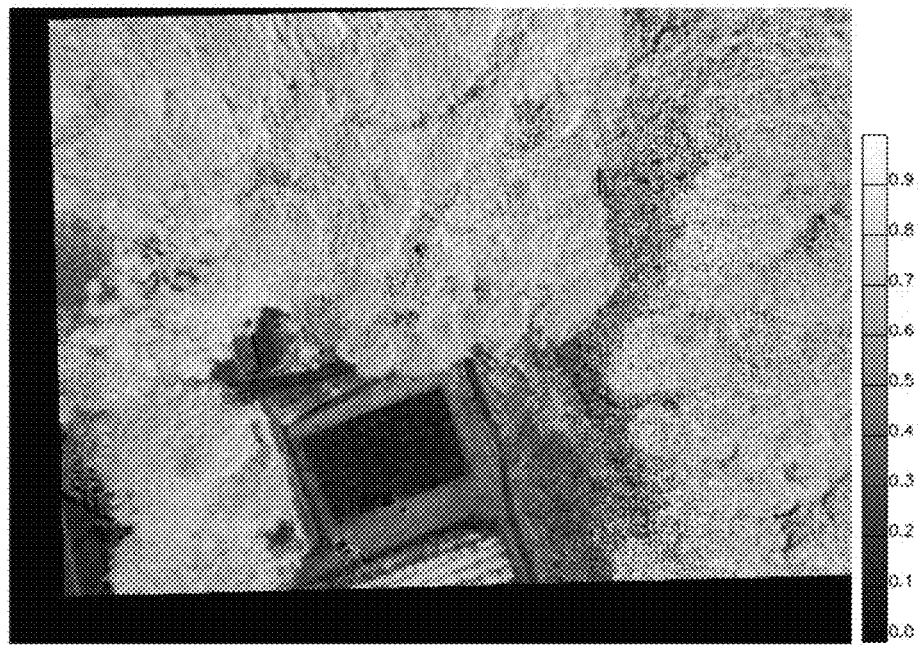
FIG. 11 shows a color map in which normalized vegetation index calculated based on the spectral image acquired by Example 1 is shown by the shade of color.

Next, as an application example of a captured spectral image, a normalized difference vegetation index (NDVI) was calculated from spectral images of two transmission wavelengths among the acquired spectral images of 33 wavelengths. FIG. 11 shows a color map in which values of the normalized difference vegetation index are represented by the shade of color. In FIG. 11, it is shown that as the value of the index approaches to 1 (as the color of shade approaches to white), the vegetation is thicker. In this way, it is possible to quantitatively evaluate the growth state of vegetation by a spectral image.

From what has been described, according to Example 1, it is shown that by capturing a spectral image from an height of about 100 m, it is possible to obtain detailed spectral information at a spatial resolution of about 20 cm.

Example 2

In Example 2, an experiment was conducted to confirm that blur of a spectral image is suppressed by the present invention. Specifically, with the exposure time being set to 20 ms and 50 ms, spectral images were captured and the angular velocity of the spectral camera was measured by an attitude sensor. Other specifications concerning image capturing are the same as in Example 1.

Figure 12:
FIG. 12 shows a spectral image obtained when the exposure time is 20 ms in Example 2.

FIG. 12 shows a spectral image which was obtained when the exposure time was 20 ms. As shown in FIG. 12, it is possible to clearly recognize captured buildings and thickly grown plants in the center and on the left side in the acquired spectral image.

Figure 13:
FIG. 13 shows a spectral image obtained when the exposure time is 50 ms in Example 2.

On the other hand, while FIG. 13 shows a spectral image which was obtained when the exposure time was 50 ms, it is seen, in contrast to FIG. 12, that buildings and plants are obscured indicating blur occurred in the spectral image.

Then, based on each exposure time, an angular velocity which allows to maintain spatial resolution without causing blur was calculated. Specifically, letting the exposure time be T, the spatial resolution be X, and the height of the spectral camera upon capturing the spectral image be H, the angular velocity was calculated as $\Omega=X/(H\times T)$. As a result of that, the angular velocity $\Omega$, at which no blur would occur at an exposure time of 20 ms, was $\Omega=0.22/(120\times0.02)=0.092$ rad/sec.

Similarly, the angular velocity $\Omega$, at which no blur would occur at an exposure time of 50 ms, was $\Omega=0.22/(120\times0.05)=0.037$ rad/sec.

On the other hand, the angular velocity of the spectral camera measured by the attitude sensor was about 0.087 rad/sec due to the effect of wind.

That is, the angular velocity of the spectral camera of about 0.087 rad/sec was slower than the angular velocity $\Omega=0.092$ rad/sec at which no blur would occur at an exposure time of 20 ms. Therefore, no blur occurred in the spectral image captured at an exposure time of 20 ms.

In contrast to that, the angular velocity of the spectral camera of about 0.087 rad/sec was faster than the angular velocity $\Omega=0.037$ rad/sec at which no blur would occur at an exposure time of 50 ms. Therefore, it is thought that a blur occurred in the spectral image captured at an exposure time of 50 ms.

What has been described so far indicated that according to Example 2, blur of spectral image is suppressed, and to suppress blur of spectral image, it is effective to control the spectral camera by setting an exposure time so as not to cause blur based on the angular velocity of the spectral camera.

Example 3

In Example 3, an experiment was conducted to confirm that when the SN ratio of a captured spectral image is less than a predetermined SN ratio threshold, it is possible to obtain a spectral image with an SN ratio not less than the SN ratio threshold by capturing a plurality of spectral images at the same transmission wavelength in succession, and superposing those spectral images with each other.

The spectral image was captured by a spectral camera installed in the multicopter type drone used in Example 1. In this occasion, the exposure time at the time of image capturing was 10 ms, and the transmission wavelength by the liquid crystal tunable filter was 650 nm.

Figure 14:
FIG. 14 shows a spectral image obtained when the exposure time is 10 ms and the transmission wavelength is 650 nm in Example 3.

FIG. 14 shows an enlarged view of a part of the first spectral image captured under the above described conditions. The SN ratio in this first spectral image was SN1=27.3. Then, letting the SN ratio threshold be SNt=40, the number of spectral images to be captured in succession by using the same transmission wavelength was calculated by using Formula (2) described above. As a result of that, Formula (2) resulted in N>2.2, and thus the necessary number of spectral images was calculated as three.

Figure 15:
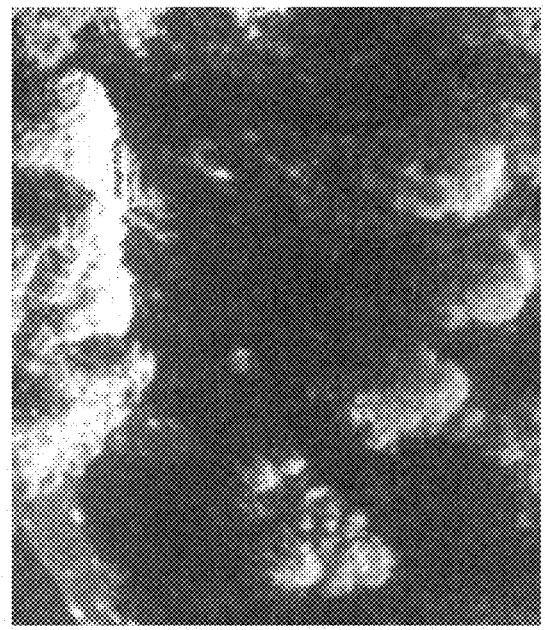
FIG. 15 shows a spectral image obtained by superposing three spectral images captured in succession including the spectral image shown in FIG. 14 in Example 3.
Figure 16:
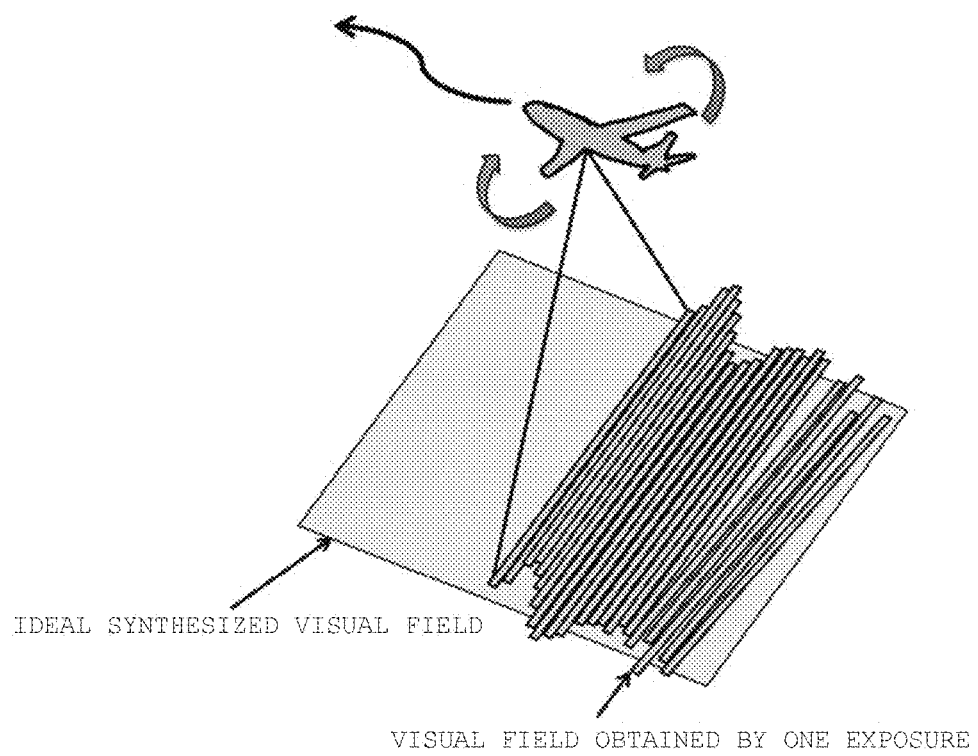
FIG. 16 shows a schematic view to illustrate problems in capturing spectral images based on a push-broom system using a conventional airplane.
Figure 17:
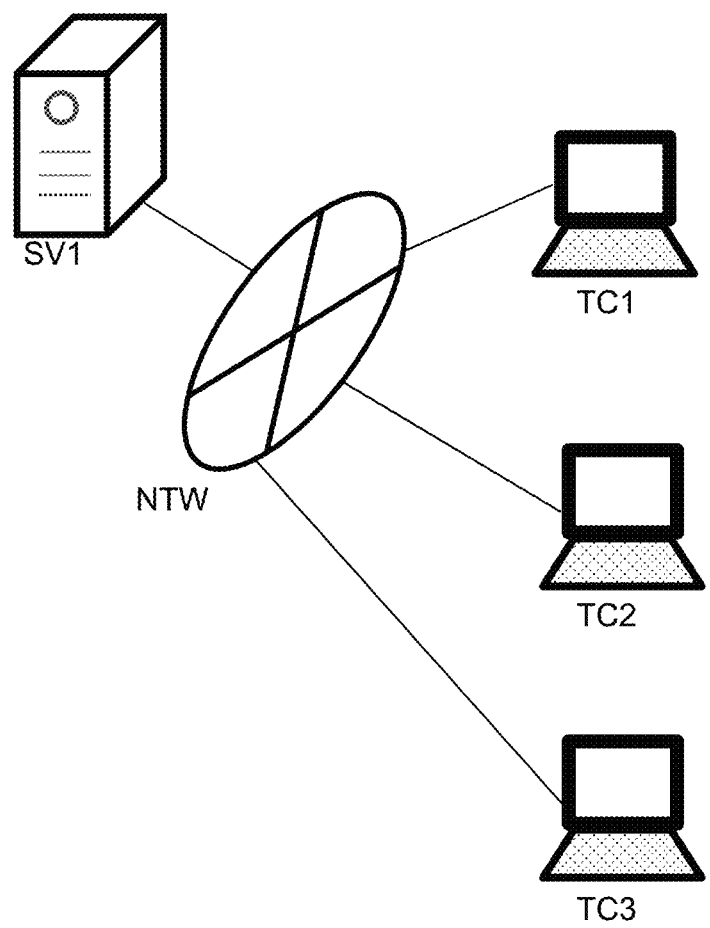
FIG. 17 shows a network system that is configured with server SV1 and terminal computers TC1 to TC3. The server distributes the invented program to one of terminal computers in correspondence with a request through network NTW.

Then superposition of three spectral images captured in succession and including the first spectral image was conducted. FIG. 15 shows a spectral image obtained by superposing three spectral images captured in succession.

The spectral image of FIG. 14 generally appears unsmooth. On the other hand, the spectral image of FIG. 15 appears in clearer contrast with reduced unsmoothness indicating that the noise is reduced. Moreover, the SN ratio of the spectral image shown in FIG. 15 was 40.5, and it was possible to obtain a spectral image with an SN ratio of more than an SN ratio threshold of 40 by superposing three spectral images in succession with each other.

From what has been described, it was shown to be possible to improve the SN ratio of a spectral image by capturing a plurality of spectral images in succession at the same transmission wavelength, and superposing those spectral images with each other. Moreover, it was shown that Formula (2) shown above is effective as means of calculating the image capturing number necessary for obtaining a spectral image with an SN ratio of more than the SN ratio threshold from the SN ratio of the first spectral image.

Note that the present invention will not be limited to the above described embodiments, and can be conveniently modified. For example, in the exposure time resetting section 625, as the height value of the aircraft to be used in calculation by Formula (1), an actually measured value by the attitude position detector may be used. Moreover, setting of each threshold and transmission of each signal and the like may be performed from a communication device through the wireless communication means 63.

REFERENCE SIGNS LIST

1 Aircraft
2 Spectral camera control system
3 Spectral camera
4 Attitude position detector
5 Liquid crystal tunable filter control circuit
6 Spectral camera control device
6a Spectral camera control program
7 Battery
31 Lens group
32 depolarizing plate
33 Liquid crystal tunable filter
34 Image sensor
41 GPS receiver
42 Attitude sensor
61 Storage means
62 Arithmetic processing means
63 Wireless communication means
311 Incident lens
312 Condensing lens
611 Program storage section
612 Image capturing start condition storage section
613 Image capturing condition storage section 614 Threshold storage section
615 Spectral image storage section
621 Image capturing start condition discrimination section
622 Optimal exposure time setting section
623 Attitude position information acquisition section
624 Attitude position change discrimination section
625 Exposure time resetting section
626 Spectral image acquisition section
627 SN ratio discrimination section
628 Successive image capturing number calculation section
629 Additional spectral image acquisition section
630 Image capturing end discrimination section
631 Wavelength specifying signal transmission section

The invention claimed is:

1. A spectral camera control device, being installed, along with a spectral camera provided with a liquid crystal tunable filter, in an aircraft capable of stationary flight, wherein
the spectral camera control device causes the spectral camera to capture a spectral image in a snapshot mode each time a transmission wavelength of the liquid crystal tunable filter is switched while the aircraft is in stationary flight, and
the spectral camera control device causes a plurality of spectral images to be captured in succession at a same transmission wavelength when an SN ratio of the captured spectral image is less than a predetermined threshold.

2. The spectral camera control device according to claim 1, wherein
a number of the spectral images to be captured in succession at a same transmission wavelength is calculated by Formula (2) shown below:

$$N > (SNt/SN1)^2 \qquad \text{Formula (2)}$$

where each symbol represents the following:
N: Number of spectral images to be captured,
SN1: SN ratio of first spectral image, and
SNt: SN ratio threshold.

3. A spectral camera control system comprising:
the spectral camera control device according to claim 1; and
a spectral camera to be controlled by the spectral camera control device.

4. An aircraft capable of stationary flight, wherein the spectral camera control system according to claim 3 is installed therein.

5. A non-transitory storage medium storing a spectral camera control program, being installed, along with a spectral camera provided with a liquid crystal tunable filter, in an aircraft capable of stationary flight, wherein
the spectral camera control program causes a computer to function as a spectral camera control device which causes the spectral camera to capture a spectral image in a snapshot mode each time a transmission wavelength of the liquid crystal tunable filter is switched while the aircraft is in stationary flight, and
the spectral camera control program causes the computer to function as the spectral camera control device which causes a plurality of spectral images to be captured in succession at a same transmission wavelength when an SN ratio of the captured spectral image is less than a predetermined threshold.

6. The non-transitory storage medium according to claim 5, wherein
the spectral camera control program causes a computer to function as a spectral camera control device which calculates a number of spectral images to be captured in succession at a same transmission wavelength by Formula (2) shown below:

$$N > (SNt/SN1)^2 \qquad \text{Formula (2)}$$

where each symbol represents the following:
N: Number of spectral images to be captured,
SN1: SN ratio of first spectral image, and
SNt: SN ratio threshold.

7. A distributing method for the spectral camera control program, which is stored in the non-transitory storage medium according to claim 5, through a network, the distributing method comprising:
a step of distributing the spectral camera control program to a terminal computer connected to the network.

8. A network system for distributing a spectral camera control program, being installed, along with a spectral camera provided with a liquid crystal tunable filter, in an aircraft capable of stationary flight, the network system comprising:
a server, and
a terminal computer that is connected to the server through a network, wherein
the control program comprises
the spectral camera control program causes a computer of the aircraft to function as a spectral camera control device which causes the spectral camera to capture a spectral image in a snapshot mode each time a transmission wavelength of the liquid crystal tunable filter is switched while the aircraft is in stationary flight, and
the spectral camera control program causes the computer to function as the spectral camera control device which causes a plurality of spectral images to be captured in succession at a same transmission wavelength when an SN ratio of the captured spectral image is less than a predetermined threshold.

9. A spectral image capturing method for capturing an spectral image utilizing a spectral camera control device which is installed, along with a spectral camera provided with a liquid crystal tunable filter, in an aircraft capable of stationary flight, the method with the spectral camera control device comprising:
causing the spectral camera to capture a spectral image in a snapshot mode each time a transmission wavelength of a liquid crystal tunable filter is switched while the aircraft is in stationary flight, and
causing the spectral camera to capture a plurality of spectral images in succession at a same transmission wavelength when an SN ratio of the captured spectral image is less than a predetermined threshold.

* * * * *